United States Patent
Hitzman

[15] 3,650,326
[45] Mar. 21, 1972

[54] HYDROCARBON RECOVERY EMPLOYING AQUEOUS MEDIUM DRIVING FLUID HAVING INCREASING VISCOSITY

[72] Inventor: Donald O. Hitzman, Bartlesville, Okla.
[73] Assignee: Phillips Petroleum Company
[22] Filed: May 25, 1970
[21] Appl. No.: 40,412

[52] U.S. Cl..............................................166/246, 166/275
[51] Int. Cl.......................................................E21b 43/22
[58] Field of Search ........................166/246, 268, 273–275;
    252/8.55 D; 195/31 P

[56]    References Cited

UNITED STATES PATENTS

| 3,372,749 | 3/1968 | Williams ............................ 166/275 X |
| 3,452,817 | 7/1969 | Fallgatter ........................... 166/268 X |
| 3,302,713 | 2/1967 | Ahearn et al. ........................ 166/274 |
| 3,020,206 | 2/1962 | Patton et al. ......................... 195/31 P |
| 3,491,834 | 1/1970 | Ahearn et al. ........................ 166/273 |
| 3,185,634 | 5/1965 | Craig et al. ......................... 166/275 X |
| 3,251,417 | 5/1966 | Holman et al. ....................... 166/246 |
| 3,326,286 | 6/1967 | Harvey ............................... 166/246 |
| 3,340,930 | 9/1967 | Hitzman ............................. 166/246 |

FOREIGN PATENTS OR APPLICATIONS 654,809  12/1962  Canada ................................. 166/275

OTHER PUBLICATIONS

Johansen, R. T., et al., Detergents For Petroleum Displacement In Soap & Chem. Spec., Oct. 1955, pp. 41– 44, 79, 81.

*Primary Examiner*—Stephen J. Novosad
*Attorney*—Young and Quigg

[57]    ABSTRACT

Hydrocarbons are recovered from a subterranean hydrocarbon containing formation by injecting an aqueous medium driving fluid through said formation to displace hydrocarbons therefrom. The aqueous medium driving fluid comprises a bacterial cellular solution that has been treated for providing a driving medium whose viscosity increases during displacement to the formation.

11 Claims, No Drawings

HYDROCARBON RECOVERY EMPLOYING AQUEOUS MEDIUM DRIVING FLUID HAVING INCREASING VISCOSITY

In conventional supplementary oil recovery operations, such as secondary recovery and pressure maintenance operations, for example, a fluid is injected into a subterranean hydrocarbon containing formation via at least one injection well to displace in-place hydrocarbons from the formation into a producing well where said hydrocarbons are delivered to the surface and recovered. In a particular recovery operation of this type, water or brine is generally employed as the aqueous medium driving fluid and the operation is referred to as waterflooding.

While conventional waterflooding processes are effective in obtaining additional hydrocarbons from a hydrocarbon containing subterranean formation, it has a number of shortcomings. A primary shortcoming of this technique is the tendency of the flooding water to finger through the hydrocarbon containing formation and bypass substantial portions of the in-place hydrocarbons. By fingering is meant the developing of unstable bulges or stringers which advance toward the production means more rapidly than the remainder of the flooding water. Furthermore, the water does not normally displace as much hydrocarbons of the formations which it contacts as it is potentially capable of doing when fingering occurs. The net result is an inefficient hydrocarbon displacement action on the part of the water.

Several methods have been suggested for improving the mechanics of waterflooding procedures, particularly with the view of reducing the degree of fingering and bypassing, and the like. One suggestion has been to increase the viscosity of the water-drive medium relative to the oil by incorporating water soluble viscous agents within the water. The materials that have been suggested for this purpose include gums, polysaccharides, polymers, and the like.

While these additives are effective to some degree in increasing the viscosity of the flooding water, they have proven ineffective for a variety of reasons for oil recovery procedure. Many of these additives form insoluble precipitants with ions contained either in the flooding water or in the in situ fluids. Also, many of the aqueous solutions of these additives suffer severe reductions in viscosity when contacting the brines, such as solutions containing sodium chloride or calcium chloride. Additionally, many of these materials are quite expensive and their use is not feasible from the standpoint of economics.

In order to avoid many of these heretofore experienced disadvantages in waterflooding operations, a waterflooding process has been discovered which utilizes an aqueous medium driving fluid comprising a bacterial cellular culture that has been treated to provide a driving fluid having a viscosity which increases during displacement of that driving fluid through the formation.

In accordance with this invention, bacterial cells are treated with formaldehyde and are thereafter treated with an anionic surfactant for providing a driving fluid having a characteristic of increasing the viscosity with the passage of time. This invention is particularly surprising in that untreated whole bacterial cells are ineffective viscosifiers for employment in aqueous mediums as fluid drives for recovering hydrocarbons, bacterial cells treated with nonionic surfactants are likewise ineffective, and if a bacterial cellular culture solution is initially treated with an anionic surfactant the resultant mixture will produce a driving fluid initially having a high viscosity as opposed to the viscosity of the driving fluid of this invention which has a relatively low viscosity that increases with the passage of time.

The particular method used for providing the bacterial cultures employed in this invention is not critical so long as the bacterial culture is formed by growing said culture on a carbon source. It is preferred, however, that the most economical method to produce the largest quantity of bacterial cells in the least amount of time be used. Accordingly, a suitable fermentation medium is simply inoculated with the bacteria and said fermentation medium maintained under growth conditions to permit multiplication of the bacterial cells. Carbon sources are provided and suitable minerals, growth factors, vitamins, and the like are generally added in amounts sufficient to provide for the particular needs of the bacteria utilized. Substrate materials on which the bacteria is grown can be sugars, n-paraffins, alcohols such as ethanol or methanol, and other carbonaceous materials can be employed. The fermentation reaction product, i.e., bacterial cells are then employed according to this invention by mixing them with formaldehyde and are thereafter treated with an anionic surfactant. The whole bacterial cells can be recovered from the fermentation media after contacting them with formaldehyde if desired. In this case the cells are hereafter separated by, for example, centrifugation and thereafter treated in accordance with this invention. It is economically preferable, however, to eliminate bacterial cell separation procedure and to merely treat the whole fermentation product solution containing the bacterial cells.

The bacterial culture solution containing the bacterial cells can be diluted, if desired, by the addition of water or aqueous solutions such as brine. They can be concentrated by the removal of water but it is important that the bacterial culture solution contains at least 0.2 weight percent of bacterial cells. Bacterial culture solutions comprising from about 2 to 4 weight percent of bacterial cells are routinely produced. The volume of formaldehyde is generally in the range of about 0.1 to 5 weight percent, preferably about 1 weight percent of the cell solution.

About 5 minutes to 24 hours after mixing the bacterial and formaldehyde mixture, an anionic surfactant is added to that mixture and the resultant viscosified aqueous medium driving fluid is injected into the hydrocarbon containing formation. The amount of time delay before adding the anionic surfactant controls the time delay in the formation before substantial increases in viscosity occurs and is selected by the operator to match the amount of viscosity increasing delay desired.

The surface agents employed according to this invention are anionic surfactants. Compounds of this class are generally characterized as forming ions in solution and are typical colloidal electrolytes and are characterized in that upon ionization the ion containing the large hydrophobic group assumes a negative charge and becomes the anion. The general properties and behavior are generally attributed to the dual character of the molecules of these substances in that they are made up of two parts, a relative large elongated part, the hydrophobic group and a small solubilizing, polar group, the hydrophilic group. Anionic surfactants are widely known and commercially available. Mixtures of anionic surfactants can also be employed according to this invention. Alkylarenesulfonates, sulfated alcohols, and the like are exemplary classes of anionic surfactants. Exemplary anionic surfactants that can be employed are propylated naphthalenesulfonic acid (sodium salt); di(2-ethylhexyl)ester of sodium sulfosuccinic acid; sodium alkylnaphthalenesulfonate; sulfonated monoglyceride of coconut fatty acid (sodium salt); polymerized alkylated arensulfonic acid (sodium salt); sodium oleyl sulfate; sodium lauryl sulfate; sodium oleylisethionate; sodium dibutylnaphthalenesulfonate; sodium dodecyl benzenesulfonate; or sulfonated alkylbenzimideazole (sodium salt); and the like. These surfactants are added in amounts sufficient for substantially all of the cells to dissolve and release the viscosifier. This amount is dependent upon the surfactant that is used.

In order to provide a resultant aqueous driving fluid that increases in viscosity at desirable rates, it is preferred that the pH of the bacterial cellular solution be adjusted to have a pH of about 7.5 after mixing the formaldehyde therewith. This pH adjustment can conveniently and acceptably be accomplished by adding one normal sodium hydroxide for example to the bacterial solution. It is also preferred to likewise and for the same reason adjust the pH value of the formaldehyde and bacterial solution mixture to a valve within the range of about 6–12. This pH adjustment can conveniently and acceptably be accomplished by adding to the formaldehyde and bacterial solution mixture materials selected from the group comprising water, an alkali such as sodium hydroxide, or mixtures thereof.

Other desirable flooding materials such as antioxidants, for example, can also be added to the flooding medium of this invention.

The desirable initial, intermediate, and final viscosities of the aqueous driving fluid are dependent upon the flooding and formation conditions and are values that can be routinely selected by one skilled in the art such as a petroleum engineer.

The following are stability tests run on various mixtures showing the effect of formaldehyde on the viscosity of bacterial preparations. These tested materials were formed from samples of a single bacterial solution having a pH of 7.5 and comprising pseudomonas type organisms grown on methanol. Viscosity measurements were made on a Fann N–G Viscometer Model 35 at 300 r.p.m. at room temperature of about 72° F. with a 300 cc. sample volume. These viscosity measurements were taken initially on each sample and thereafter at 5, 10, and 15 day intervals. The HCHO added was from a 37 percent formaldehyde solution and the volume of cells on a dry weight basis was 25 g. per liter of the solution.

TABLE

| | Fann Viscometer Model 35, readings at— | | | |
|---|---|---|---|---|
| Sample composition [1] | 0 time | 5 days | 10 days | 15 days |
| 1. 100 cc. cell sol.+1% HCHO+200 cc. tap water+pH to 11+4% NaLS | 11 | 51 | 43 | 43 |
| 2. 100 cc. cell sol.+200 cc. tap water+1% HCHO+pH to 11+0.4% NaLS | 12.5 | 32 | 17 | 10 |
| 3. 100 cc.+200 cc. tap water+pH to 11+1% HCHO+0.04% NaLS | 52 | 23 | 17.5 | 16 |
| 4. 100 cc. cell sol.+200 cc. tap water+pH to 11+0.4% NaLS+1% HCHO | 53 | 53 | 29 | 15 |
| 5. 100 cc. cell sol.+1% HCHO+pH to 11+200 cc. tap water+0.4% NaLS | 9.5 | 47 | 43 | 45 |
| 6. 100 cc. cell sol.+pH to 11+200 cc. tap water+0.4% NaLS+1% HCHO | 38 | 28 | 23 | 15 |
| 7. 100 cc. cell sol.+1% HCHO+0.4% NaLS+200 cc. tap water+pH to 11 | 10.5 | 72 | 63 | 63 |
| 8. 100 cc. cell sol.+0.4% NaLS+200 cc. tap water+pH to 11+1% HCHO | 41 | 34 | 26 | 13 |
| 9. 100 cc. cell sol.+1% HCHO+200 cc. tap water+pH to 11 | 7.5 | 22.5 | 13 | 12 |
| 10. 100 cc. cell sol.+200 cc. tap water+1% HCHO+pH to 11 | 7.5 | 18 | 7.5 | |
| 11. 100 cc. cell sol.+200 cc. tap water+pH to 11+1% HCHO | 52 | 50 | 12.5 | |
| 12. 100 cc. cell sol.+1% HCHO+200 cc. tap water+0.4% NaLS | 7 | 21 | 16 | |
| 13. 100 cc. cell sol.+200 cc. tap water+1% HCHO+0.4% NaLS | 8 | 16 | 4.5 | |
| 14. 100 cc.+200 cc. tap water+0.4% NaLS to 1% HCHO | 27 | 6 | 4.5 | |

[1] Sample composition having components mixed in the order listed.

These tests indicate the addition of formaldehyde prior to the addition of the anionic surfactant or adjustment in pH to a pH of 11 causes a delay in the formation of viscosity and the maintenance of the high viscosity over extended periods of time, as shown by Sample Compositions 1, 2, 5, 7, 9, 10, 12, and 13 of the table. Sample Compositions 3, 4, 6, 8, 11, and 14 show immediate buildup of viscosity owing to changing the pH or adding the surfactant prior to addition of the formaldehyde.

By so providing a driving fluid of this invention, fingering of the fluid within the formation is decreased while initial pumping of the fluids required lower horsepower requirements than heretofore utilized increased viscosity flooding fluids.

Other modifications and alterations of this invention will become apparent to those skilled in the art from the foregoing discussion and table and it should be understood that this invention is not to be unduly limited thereto.

What is claimed is:

1. In a process for recovering hydrocarbons from a subterranean hydrocarbon-containing formation by injecting therein an aqueous medium driving fluid through said formation to displace hydrocarbons therefrom, the improvement comprising:

employing an aqueous medium driving fluid containing a viscosifier produced by the action of first mixing an aqueous bacterial cellular culture comprising whole bacterial cells to the extent of at least 0.2 weight percent with a volume of formaldehyde, thereafter adding an anionic surfactant to the bacterial cellular culture and formaldehyde mixture, said anionic surfactant being added in amount substantially sufficient to dissolve said bacterial cells, and wherein the pH of said aqueous medium driving fluid is adjusted to a pH range of about 6 to 12.

2. A process, as set forth in claim 1, wherein the bacterial cellular culture comprises up to about 4 weight percent whole bacterial cells.

3. A process, as set forth in claim 2, wherein the bacterial cellular culture and formaldehyde mixture, or the admixture thereof with said anionic surfactant, is adjusted to have a pH of about 7.5.

4. A process, as set forth in claim 1, wherein the volume of the formaldehyde employed is in the range of about 0.1 to 5 weight percent of the bacterial cellular culture.

5. A process, as set forth in claim 4 wherein the anionic surfactant is added to the bacterial cellular culture and formaldehyde mixture about 5 minutes to 24 hours after forming the bacterial cellular culture and formaldehyde mixture.

6. A process, as set forth in claim 5, wherein the pH of the bacterial cellular culture and formaldehyde mixture is adjusted to a value in the range of about 6 to 12.

7. A process, as set forth in claim 6, wherein the pH of the bacterial cellular culture and formaldehyde mixture is adjusted by adding to the mixture water, an alkali, or mixtures thereof.

8. A process, as set forth in claim 7 wherein the anionic surfactant is sodium lauryl sulfate, and said bacterial cellular culture is produced by pseudomonas type organisms.

9. The process according to claim 1 wherein the pH of said mixture containing said anionic surfactant is adjusted to a pH value in the range of about 6 to 12, and the pH adjustment is accomplished by adding to said mixture containing said anionic surfactant water, an alkali, or mixtures thereof.

10. A process for recovering hydrocarbons from a subterranean hydrocarbon-containing formation by injecting therein an aqueous medium driving fluid through said formation to displace hydrocarbons therefrom, the improvement comprising:

a. employing an aqueous medium driving fluid containing a viscosifier produced by the action of first mixing an aqueous bacterial cellular culture comprising whole bacterial cells to the extent of at least 0.2 weight percent with a volume of formaldehyde, b. recovering from said step (a) the formaldehyde treated bacterial cells from said aqueous bacterial cellular culture and formaldehyde mixture,
c. admixing said recovered formaldehyde treated bacterial cells with water to form an aqueous admixture therewith containing at least 0.2 weight percent of said whole bacterial cells, and
d. contacting said aqueous admixture containing formaldehyde treated whole bacterial cells with anionic surfactant in amounts substantially sufficient to dissolve said bacterial cells, thereby producing said viscosifier.

11. A process, as set forth in claim 10, wherein an alkaline material is added to said aqueous admixture prior to or subsequent to contacting said admixture with said anionic surfactant, and said alkaline material is sufficient to adjust the pH of said admixture to a range of between 6 and 12.

* * * * *